Nov. 9, 1926.
W. D. GRAHAM
1,606,526
WINDSHIELD AND THE LIKE
Filed Dec. 7, 1925
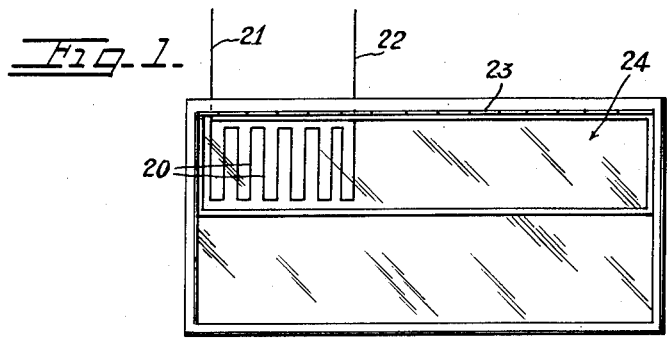
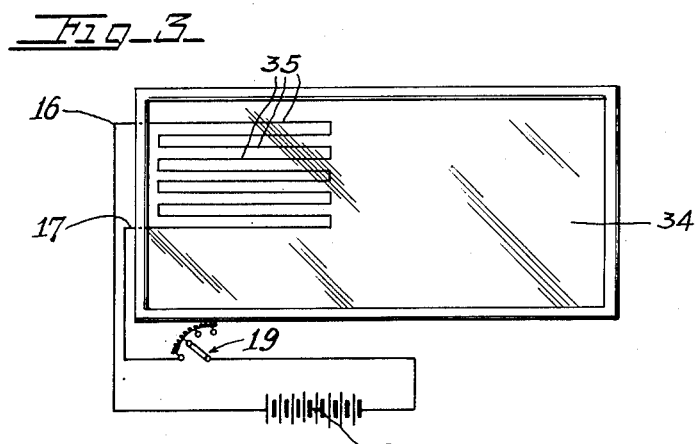
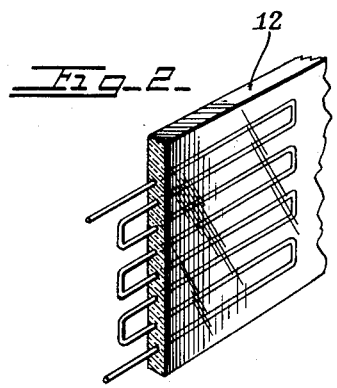
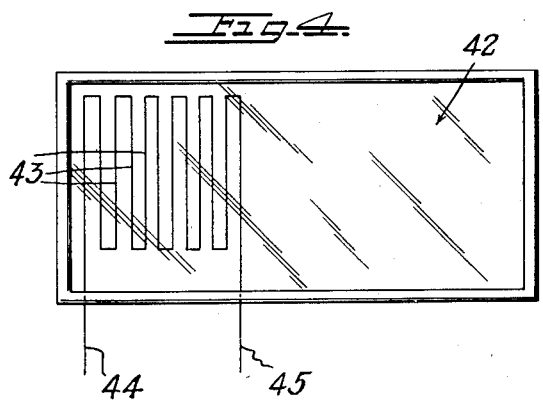
Inventor.
Walter D. Graham Patented Nov. 9, 1926.

1,606,526

UNITED STATES PATENT OFFICE.

WALTER D. GRAHAM, OF RIVER FOREST, ILLINOIS.

WINDSHIELD AND THE LIKE.

Application filed December 7, 1925. Serial No. 73,782.

The present invention has to do with improvements in wind shields and the like. The features of the invention are primarily intended for use in connection with wind shields of automobiles and other similar vehicles.

The primary object of the invention is to provide means integral with and built directly into the glass or transparent pane or object for heating the same under control of the user by the use of electric current. In other words, to establish suitable electric heating conductors within the body of the wind shield, so that the same can be heated by an electric current to the extent necessary to prevent deposition of frost, snow, ice, sleet, etc.

Another object in connection with the foregoing is to so arrange the electric conductors within the body of the glass window or pane that a minimum amount of obstruction will be occasioned to clear an unobstructed vision therethrough. This result is accomplished both by the size of the wires, their spacing, and the manner in which they are placed within the glass pane.

Another object of the invention is to provide means for heating the wind shield only locally at the point needed to allow for unobstructed vision so as to minimize the consumption of the current.

Another object of the invention is to provide a self-contained or unitary article of manufacture in the form of a wind shield glass including the glass pane together with the embedded electric conductors for the purpose intended and locally placed, so that said article of manufacture may be set into place in the frame of an automobile wind shield, the connections being readily established to the terminals of the electric circuit projecting from the integral pane within which the electric conductor is operated.

Other objects and uses of the invention will appear from a detailed description of the same, which consists in the features of construction and combinations of parts hereinafter described and claimed.

In the drawings:

Fig. 1 shows a view illustrating the invention applied to one upper corner of a two piece wind shield, the terminals of the conductor being brought out at the hinged support of the upper wind shield sash;

Fig. 2 shows a fragmentary perspective view of a glass pane having embedded therein an electric conductor comprising a plurality of parallel wires connected up in series, the glass pane being cut away at the position of the conductors so as to reveal the wires projecting therefrom at one side;

Fig. 3 shows a face view of another construction of wind shield having a portion of one side thereof provided with a plurality of horizontal wires connected up in series with each other and shows diagrammatically how the electric current may be supplied to the same under control of a suitable circuit and rheostat; and Fig. 4 shows a face view of a wind shield having embedded therein a plurality of vertical wires occupying one side of the pane and connected up in a series with each other.

Referring first to Fig. 1, the wind shield glass is designated generally by the numeral 24. It is provided with a suitable border or frame. This frame may be either an independent structure within which the glass pane is mounted, or may constitute an integral portion of the glass pane itself of increased thickness and strength.

Within the body of the glass pane 12 I embed a plurality of wires 20. These wires are embedded directly into the body of the glass at the time that the glass sheet is rolled. This fact is made clearly evident from examination of Fig. 2, in which it is shown that various strands extend longitudinally through the central body portion of the glass pane.

The strands 20 are of relatively small wire and are so spaced as to minimize the interference with free and unobstructed vision through the glass. For example, the individual strands may be placed from one-half inch to one inch apart, and they may be made of wire perhaps one thirty-second to one sixty-fourth of an inch in diameter, although I do not intend to limit myself either to the spacing or diameters above given, except as I may do so in the claim. Furthermore, the wires may be of any suitable metal, such as copper, iron or steel. Preferably they are of metal having a relatively high degree of electric resistance, so as to class as resistance or heating wires, but the selection of the kind of material for the wires is left largely within the judgment of the designer, since the kind of material will affect the electric resistance, which in turn will depend upon the voltage and amperage available for the service.

Furthermore, the wire may be left uncovered or insulated since, being embedded directly into the body of the glass, its various strands are amply insulated from each other and from other objects. In some cases, however, it may be found desirable to use enameled wire in order to improve the original manufacturing operations. Furthermore, the wire should be so selected as to have a thermal co-efficient of expansion approximating that of the glass itself so as to reduce mechanical strains occasioned with changes of temperature.

The various strands 20 in Fig. 1 are illustrated as being connected up in series with each other by the end connections. In fact, the entire heating element may comprise a single length of wire lapped back and forth as illustrated in Fig. 1.

The terminals 21 and 22 projecting from the edge portion of the glass pane may be suitably insulated and connected into an electric switch in any convenient manner. For example, in Fig. 3 there is illustrated a storage battery 18 for supplying the current to the wires 16 and 17 under control of a switch 19 which is made in the form of a rheostat so as to control the heating effect exerted on the window. In most cases, however, the rheostat may be eliminated and the current from the battery be applied directly to the heating unit in the glass pane.

In Fig. 1, the invention is shown as applied to one corner of a wind shield structure, and, in this case, the individual strands 20 are placed vertically instead of horizontally. They are connected up in series with each other, and their end terminals 21 and 22 are brought out at the top edge 23 of the wind shield panel 24, the panel being hinged along said edge.

In Fig. 3, there is illustrated a wind shield 34 having applied to one corner thereof a heating element comprising a plurality of horizontal strands 35 connected up in series between the end connections 16 and 17, as already explained.

In the construction of Fig. 4, the wind shield 42 is provided with a series of vertical strands 43 reaching approximately the full height of the wind shield and connected in series relationship between the end terminals 44 and 45.

It will be noted that in each of the structures illustrated I have provided a plurality of electric conductors which are directly embedded in the body of the transparent glass pane or object, said conductors being spaced from each other and of such size as to minimize interference with free vision through the pane or object in which they are embedded, and being so connected electrically as to afford a circuit which can be controlled for the proper heating action by electric current. It will furthermore be noted that in each instance I have provided an article of manufacture in the form of a glass wind shield having the electric resistance conductors placed locally therein and connected up into circuit so as to heat said pane locally, all portions of the conductors being embedded directly in the glass pane so as to avoid any possibility of a short circuit or the like.

While I have herein shown and described only certain embodiments of the features of my present invention, still I do not intend to limit myself to the same, except as I may do so in the claim.

I claim:

As a new article of manufacture, a transparent glass windshield panel for a vehicle having embedded in a local relatively small section thereof an electric resistance conductor comprising a series of horizontal, parallel and substantially straight conductors, together with suitable end connections joining said conductors together, and having all portions of said horizontal conductors and end connections completely embedded in the pane of glass of the panel to thereby eliminate danger of extraneous contacts, together with suitable terminal connections to said electric resistance conductor, whereby there is produced a self-contained windshield glass panel having a local electric heating circuit protected by the glass to a maximum degree and whereby the desired heating effect may be produced with a minimum consumption of electric current, and whereby the interference of the conductors with vision through the glass panel for normal driving operations is reduced to a minimum, substantially as described.

WALTER D. GRAHAM.